United States Patent [19]
Yoshimura et al.

[11] Patent Number: 5,270,290
[45] Date of Patent: Dec. 14, 1993

[54] INFORMATION RECORDING MEDIUM AND METHODS OF RECORDING AND REPRODUCING INFORMATION ON AND FROM THE INFORMATION RECORDING MEDIUM

[75] Inventors: Hideto Yoshimura; Hiroshi Sugahara, both of Amagasaki, Japan

[73] Assignee: Mitsubishi Denki Kabushiki Kaisha, Tokyo, Japan

[21] Appl. No.: 343,268

[22] PCT Filed: Aug. 29, 1988

[86] PCT No.: PCT/JP88/00858
§ 371 Date: Apr. 14, 1989
§ 102(e) Date: Apr. 14, 1989

[30] Foreign Application Priority Data
Aug. 28, 1987 [JP] Japan .................. 62-215589

[51] Int. Cl.$^5$ .................. B05D 5/12; G11B 7/00
[52] U.S. Cl. .................. 505/1; 505/730; 369/101
[58] Field of Search ............ 505/1, 700, 701, 730–732; 427/38, 48; 360/120, 106, 59; 369/101, 106, 272, 275.1, 282, 283, 288, 126; 356/160, 161, 118; 428/930, 978, 694, 611

[56] References Cited

U.S. PATENT DOCUMENTS

| | | | |
|---|---|---|---|
| 4,921,833 | 5/1990 | Takano | 505/1 |
| 4,940,693 | 7/1990 | Shappirio et al. | 505/1 |
| 4,952,390 | 8/1990 | Takei et al. | 505/725 |
| 4,957,899 | 9/1990 | Heijman et al. | 505/730 |
| 4,962,086 | 10/1990 | Gallagher et al. | 505/1 |
| 4,971,948 | 11/1990 | Dam et al. | 505/1 |
| 4,980,339 | 12/1990 | Setsune et al. | 505/1 |
| 5,132,945 | 7/1992 | Osato et al. | 360/59 X |
| 5,143,894 | 9/1992 | Rothschild et al. | 505/732 X |

FOREIGN PATENT DOCUMENTS

| | | | |
|---|---|---|---|
| 51-3181 | 1/1976 | Japan . | |
| 0247936 | 2/1989 | Japan . | |
| 0256092 | 10/1989 | Japan | 365/160 |

OTHER PUBLICATIONS

Gubser and Schluter, "High Temperature Superconductors", Apr. 1987, pp. 81–82.
Japanese Journal of Applied Physics vol. 26, No. 9, Sep. 1987, pp. L1451–L1452.
American Chemical Society, 1987, pp. 1645–1646.
American Institute of Physics, 1987, pp. 619–621 vol. 51, No. 8, Aug. 1987.

*Primary Examiner*—Aristotelis Psitos
*Assistant Examiner*—Thang V. Tran

[57] ABSTRACT

The present invention pertains to an information recording medium for recording audio information, visual information, data information and so on and also to information recording and reproducing methods for recording and reproducing information on and from the information recording medium for the purpose of improving the recording density. In the present invention, information can be recorded in high density by recording, on the information recording medium comprising a base (1) and an information recording layer (10) formed on the base (1) and made of high temperature superconductive material, information in the form of a fine pattern of high temperature superconductive regions (12) and normal electroconductive regions (11). The recording of the information is carried out by radiating an oxygen ion beam to the information recording layer and controlling the amount of oxygen, contained in the high temperature superconductive material, to a predetermined value. The reproduction is carried out by, for example, creating a difference in amount of magnetic fluxes in a pick-up coil depending on the presence or absence of the superconductive region in the information recording layer.

14 Claims, 4 Drawing Sheets

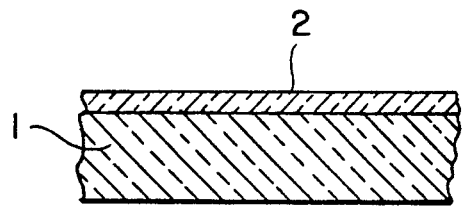
FIG. 1
FIG. 2a
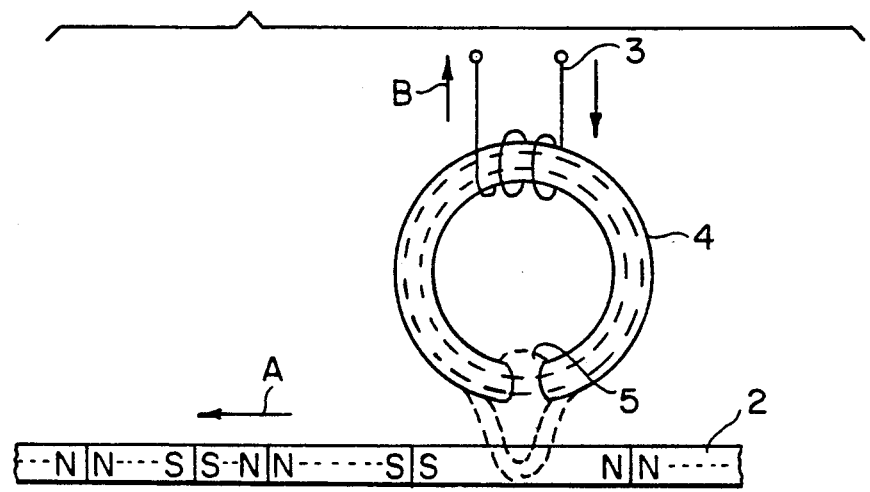
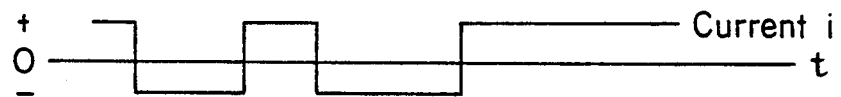
FIG. 2b
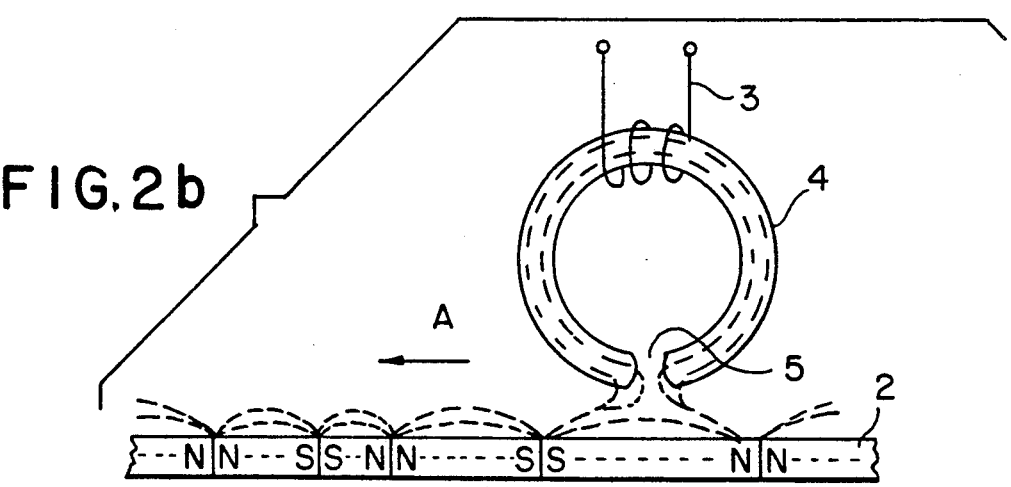
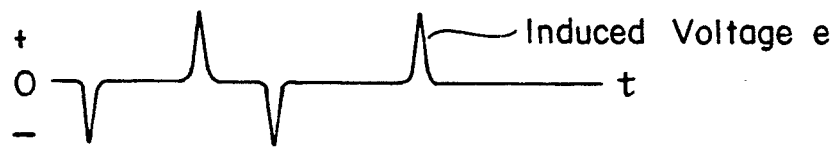

INFORMATION RECORDING MEDIUM AND METHODS OF RECORDING AND REPRODUCING INFORMATION ON AND FROM THE INFORMATION RECORDING MEDIUM

FIELD OF INVENTION

The present invention generally relates to an information recording medium and methods of recording and reproducing information on and from the information recording medium, respectively, and, more particularly, to the information recording medium for recording thereon, for example, audio information, visual information and data information and the respective methods of recording and reproducing such information on and from the information recording medium.

BACKGROUND ART

FIG. 1 is a sectional view of the conventional information recording medium (hereinafter referred to as a recording medium), for example, a magnetic recording tape, disclosed in, for example, "AUDIO HANDBOOK" (published from Ohm Publishing Co. in 1978). In this figure, reference numeral 1 represents a base and reference numeral 2 represents a magnetizable layer coated on the base 1. The base 1 is prepared from, for example, cellulose acetate, polyvinyl chloride, polyester, etc., and the magnetizable layer 2 is in the form of a lacquer made of, as a principal component, a needle-shaped powder of iron oxide generally referred to as gamma hematite ($\gamma$-$Fe_2O_3$). FIG. 2 is an explanatory diagram showing the manner in which information is recorded on and reproduced from this magnetic recording tape. In this figure, reference numeral 3 represents a coil, reference numeral 4 represents a core and reference numeral 5 represents a gap, the coil 3, the core 4 and the gap 5 altogether forming a magnetic recording and/or reproducing head. The arrow A represents the direction of movement of the tape and the arrow B represents the direction of flow of an electric current. The operation will now be described.

The operation which takes place when information is recorded on the magnetic tape will be described with particular reference to FIG. 2(a). When an electric current i of such a waveform as show is allowed to flow through the coil 3, a leakage magnetic field is produced across the gap 5. By the action of this leakage magnetic field, the magnetizable layer 2 of the magnetic tape is magnetized to N-S. Since the magnetic tape is transported in the direction of the arrow A, information is successively recorded thereon as it moves. The operation which takes place when the information on the magnetic tape is reproduced from the magnetic tape will be described with particular reference to FIG. 2(b). The magnetic field generated as a result of the magnetization of the magnetizable layer 2 to N-S exists in the vicinity of the magnetic tape. During the movement of the magnetic tape in the direction of the arrow A, the magnetic flux passes the gap 5 and permeates into the magnetic head. By this magnetic flux, an induced voltage e is induced in the coil 3 as shown according to Faraday's law.

In the conventional recording medium constructed as hereinbefore described, the distance between N and S poles shortens with increasing recording density. With the shortened distance between N and S poles, an enhanced degaussing action occurs as a result of the presence of a diamagnetic field and, therefore, magnetization becomes difficult. Accordingly, the recording density of the magnetic recording medium has been limited because of this degaussing action.

The present, invention has been developed in an effort to eliminate the above discussed problem and is intended to provide a recording medium and methods of recording and reproducing information on and from the recording medium, respectively, wherein the recording density can be increased as compared with that in the conventional magnetic recording medium.

SUMMARY OF THE INVENTION

The present invention pertains to a recording medium provided with an information recording layer made of high-temperature superconductive material formed on the base, and respective methods of recording and reproducing information on and from such a recording medium. By this structure, due to a fine pattern formed by a superconductive area and a normal electroconductive area, information can be recorded in high density.

BRIEF DESCRIPTION OF THE DRAWINGS

FIG. 1 is a sectional view of the conventional recording medium;

FIGS. 2(a) and 2(b) are explanatory diagrams used to illustrate the principle of recording and reproducing information on and from the conventional recording medium, respectively;

DETAIL DESCRIPTION OF THE PREFERRED EMBODIMENT

Hereinafter, one embodiment of the present invention will be described with reference to the accompanying drawings.

Figure 3:
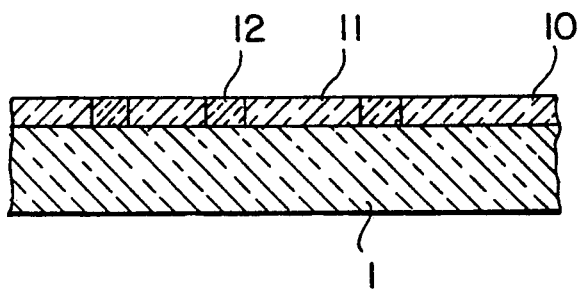
FIG. 3 is a sectional view of a recording medium according to one embodiment of the present invention.

FIG. 3 is a structural diagram showing one embodiment of a recording medium according to the present invention, on which information is shown as recorded. In this figure, reference numeral 10 represents an information recording layer formed on the base 1 and made of high temperature superconductive material, information being recorded with normal electroconductive regions 11 and superconductive regions 12. The high temperature superconductive material herein referred to is the one having a critical temperature equal to or higher than 80 K and an example thereof includes, for example, $YBa_2Cu_3-x$ (x being in the vicinity of about 0.2), the critical temperature of which is about 90 K. In this case, it is necessary to keep the temperature of the recording medium at a temperature not higher than 90

K. A powder of this high temperature superconductive material is, for example, coated on the base 1 to form a coated layer.

Hereinafter, the operation will be described.

Figure 4:
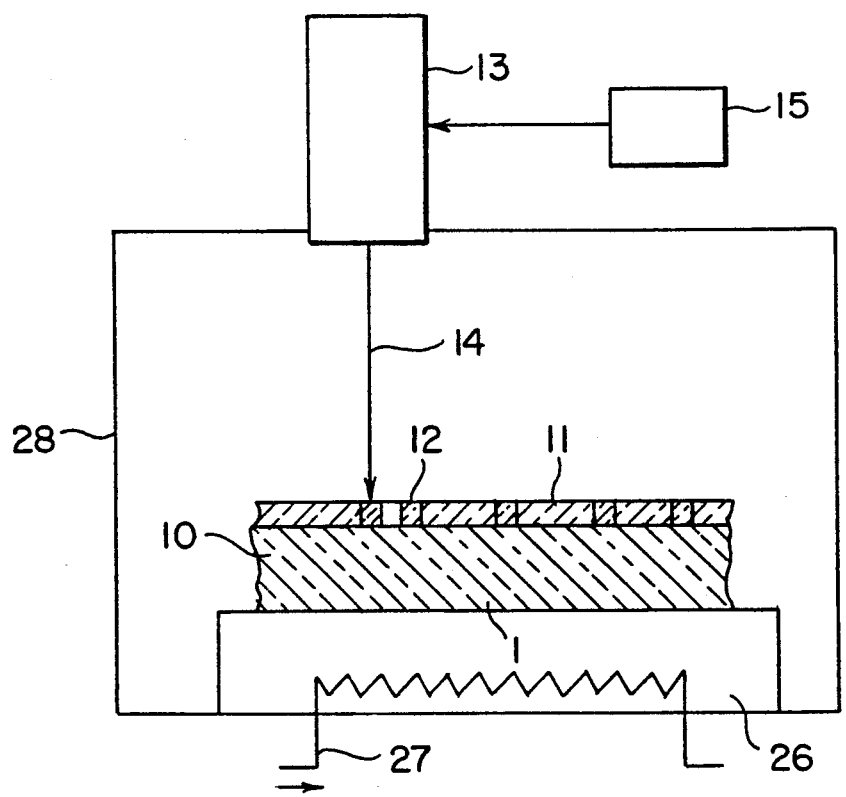
FIG. 4 is an explanatory diagram used to illustrate the principle of recording information in accordance with one embodiment of the present invention.

Recording on the recording medium is accomplished by locally forming the superconductive regions 12 and the normal electroconductive regions 11 on the high temperature superconductive material. In other words, by allocating a binary digit of 0 or 1 depending on whether or not the superconductive regions 12 are present, recording of information can be accomplished. In this embodiment, the local formation of the superconductive regions 12 and the normal electroconductive regions 11 are accomplished by varying the composition of $YBa_2CU_3O_7-x$. It is well known that $YBa_2Cu_3O_7-x$ does not exhibit a superconductive state if the amount of oxygen is not greater than 6.3. An example of the information recording method utilizing this will now be described with reference to FIG. 4. In this figure, reference numeral 13 represents an oxygen beam generator for generating an oxygen ion beam 14, which may comprise a known oxygen ion generator, ion beam accelerator, and ion beam converger. The recording medium 10 is placed on an X-Y drive table 26 movable not only in an X-axis direction, but also in a Y-axis direction and, at the time of recording or reproducing of the information, the recording medium 10 is moved by the X-Y drive table 26 in one or both of the X-axis and Y-axis directions. A flexible tube 27 is installed inside the X-Y drive table 26. Reference numeral 28 represents a vacuum chamber within which the X-Y drive table 26 is disposed. The flexible tube 27 serves to supply liquid $N_2$ therethrough from the outside of the vacuum chamber 28 as shown by the arrow, and the X-Y drive table concurrently serves as a cooling plate for the recording medium 10. Reference numeral 15 represents an oxygen beam controlling unit for controlling the oxygen beam generator 13 according to information to be recorded. While the high temperature superconductive material for the recording medium is prepared beforehand with the use of $YBa_2Cu_3O_7-x$ (x >0.7), the oxygen ion beam 14 from the oxygen beam generator 13 is focused thereon by the oxygen beam controlling unit 15 according to the information to locally inject oxygen in $YBa_2Cu_3O_7-x$. Then, the amount of oxygen at that portion where the oxygen ion beam 14 has been injected attains a value equal to or greater than 6.3 and a superconductive state can be established at a temperature not higher than 90 K. Therefore, if the intensity of the oxygen ion beam 14 is modulated by the oxygen beam controlling unit 15 according to the information to be recorded, the information can be recorded on the information recording layer 10 of the recording medium.

Figure 5:
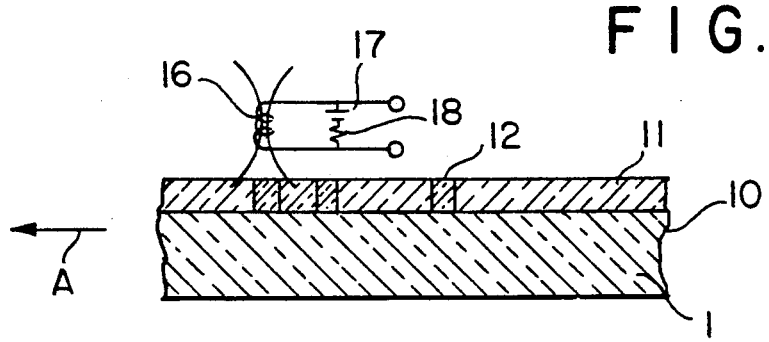
FIG. 5 and FIGS. 6(a) and 6(b) are explanatory diagrams used to illustrate the principle of reproducing information in accordance with one embodiment of the present invention.

One example of the method of reproducing the information recorded on the information recording layer 10 will now be described with reference to FIGS. 5 and 6.

Figure 6A:
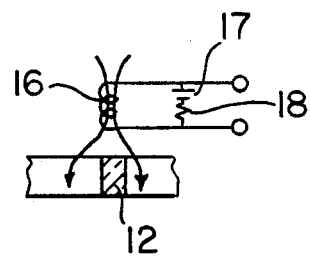
Figure 6B:
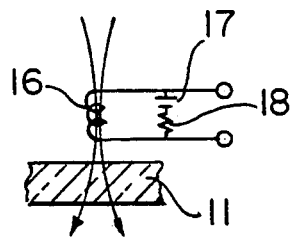
Figure 7:
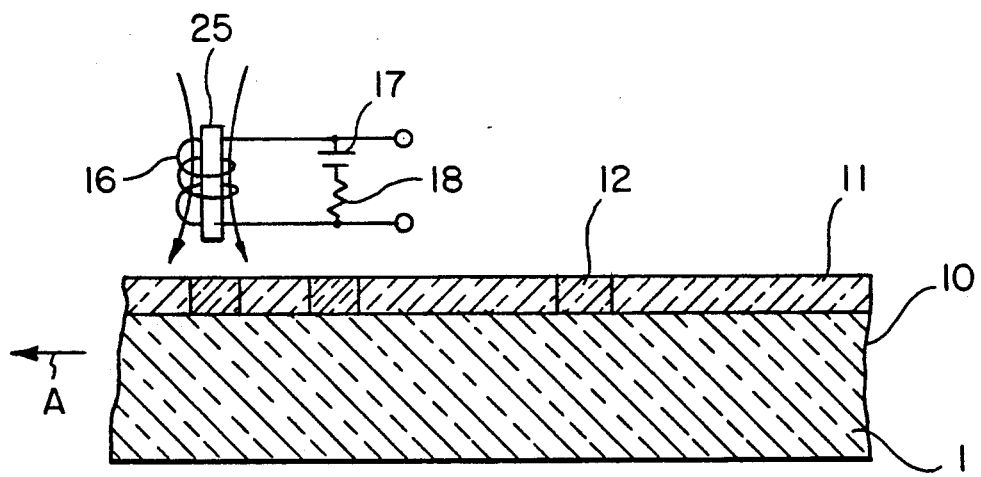
FIGS. 7 and 8 are explanatory diagrams used to illustrate a method of reproducing information according to another embodiment of the present invention.

In these figures, reference numeral 16 represents a pick-up coil (a coreless solenoid); reference numeral 17 represents a battery or batteries used to supply an electric current across the pick -up coil 16 to form an electromagnetic field as shown by arrow-headed lines; and reference numeral 18 represents a resistor. While the recording medium is moved in the direction of the arrow A, the pick-up coil 16 scan the information recording layer 10. If the superconductive region 12 exists underneath the pick-up coil 16 as shown in FIG. 6(a), the electromagnetic field formed by the pick-up coil 16 is affected by Meissner effect of the superconductive region 12 so as to bend. On the other hand, if the normal electroconductive region 11 exists underneath the pick-up coil 16 as shown in FIG. 6(b), the magnetic field formed by the pick-up coil 16 will not be affected. Accordingly, depending on whether or not the superconductive region 11 exists underneath the pick-up coil 16, the amount of magnetic fluxes within the pick-up coil 16 varies. This variation in amount of the magnetic fluxes induces an electric voltage across the pick-up coil 16. Therefore, by detecting the electric voltage so induced across the pick-up coil 16, the reading of information is possible. With this information recording medium, degaussing action resulted from the diamagnetic field accompanying the conventional formation recording medium is eliminated and therefore, the recording density thereof can be increased. FIG. 7 illustrates an embodiment wherein an iron core 25 is inserted in the pick-up coil 16 for enhancing the detecting capability of the pick-up coil 16. It is to be noted that, although in the foregoing embodiment reference has been made to $YBa_2Cu_3O_7-x$ of 90 K in critical temperature used as the high temperature superconductive material, the present invention is not necessarily be limited thereto and any high temperature superconductive material having the critical temperature equal to or higher than room temperature (300 K) can be used.

Also, the information recording layer may be formed by vapor-depositing the high temperature superconductive material or the thin film may be formed on the base by the use of the CVD (chemical vapor deposition) technique.

Yet, the information recording method may not be always limited to that hereinabove described, and the radiation of a laser beam to the material which contains a sufficient amount of oxygen and which is held in a superconductive state, followed by a localized heating to evacuate the oxygen gas can result in the formation of the normal electroconductive region il. In addition, a required pattern of the superconductive regions 12 and the normal electroconductive regions 11 can also be formed by the use of a photolithographic technique.

Figure 8:
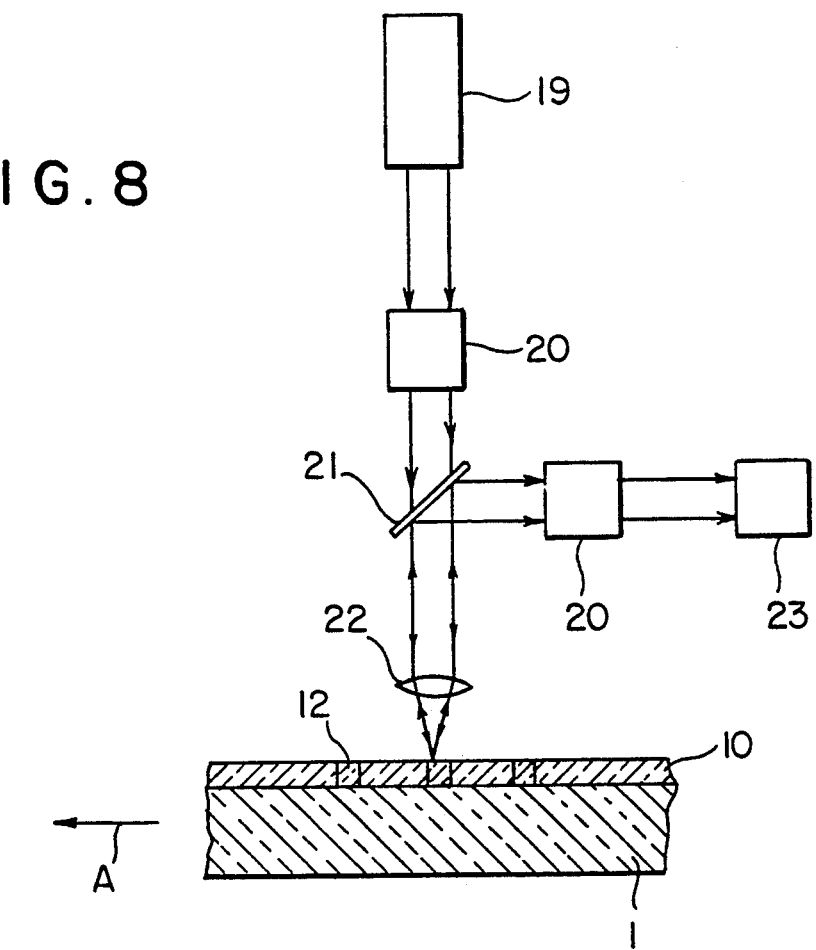

Moreover, the information reproducing method may not be always limited to that hereinabove described, and the use may be made of an optical pick-up utilizing Kerr effect or Faraday effect. FIG. 8 illustrates an explanatory diagram of a reproducing device utilizing such an optical pick-up. In this figure, reference numeral 19 represents a laser source; reference numeral 20 represents a polarizing element; reference numeral 21 represents a beam splitter; reference numeral 22 represents a lens; and reference numeral 23 represents a detector. A laser beam generated by the laser source 19 is rendered by the polarizing element 20 to be a laser beam which oscillates in one direction, which laser beam is subsequently converged on the information recording layer 10 through the beam splitter 21 and the lens 22. When rays of light reflected from the information recording layer 10 are detected by the detector 23 through the polarizing element 20, it is possible to detect, by the utilization of Kerr effect, whether it is the superconductive region 12 or whether it is the normal electroconductive region 11.

Furthermore, although in the foregoing embodiment reference has been made to the recording and reproduction of the digital signal, the recording and reproduction of an analog signal is also possible. By way of example, since the property of $YBa_2Cu_3O_7-x$ being magnetized varies with the amount of oxygen, a modulation of the amount of oxygen with the use of the analog signal makes it possible to record or reproduce information.

Figure 9:
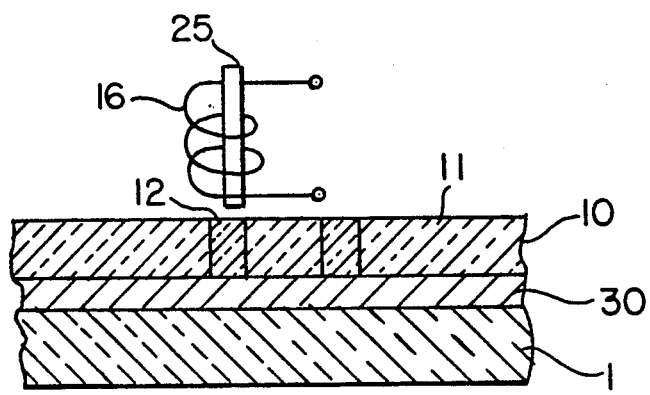
FIG. 9 is a structural diagram showing a recording medium according to a further embodiment of the present invention and respective methods of recording and reproducing information on and from the recording medium according to such further embodiment of the present invention.

FIG. 9 illustrates the other embodiment of the present invention which, as compared with the embodiment of FIG. 3, differs therefrom in respect of the structure of the recording medium and also in the information reproducing method. Referring to FIG. 9, reference numeral 30 represents a magnetizable layer interposed between the base 1 and the information recording layer 10 and effective to generate a magnetic field in a direction perpendicular to the surface of the information recording layer 10.

At the time of reproduction of the information, lines of magnetic force emanating from the magnetizable layer passes through the normal electroconductive region although they do not pass through the superconductive region 12. Accordingly, those lines of magnetic force which have passed through the normal electroconductive region 11 induces an electric voltage across the pick-up coil 16. By detecting the electric voltage so induced, the information can be reproduced.

The recording medium as well as the information recording and reproducing methods for recording and reproducing information on and from the recording medium, respectively, according to the present invention can be widely utilized as a recording medium capable of recording audio information, visual information and/or data information in high density and the information recording or reproducing method for recording or reproducing such information on or from such recording medium.

What is claimed is:

1. A recording medium comprising a base, a magnetizable layer formed on the base and an information recording layer formed on the magnetizable layer and made of superconductive material having a critical temperature equal to or higher than 80° K.

2. The recording medium as defined in claim 1, wherein the information recording layer is a coating of a powder of the superconductive material.

3. The recording medium as defined in claim 1, wherein the information recording layer is a thin film of superconductive material.

4. The recording medium of claim 1 wherein said information recording layer records information by encoding the information into respective superconductive and non-superconductive areas.

5. The recording medium of claim 4 wherein said superconductive material has an oxygen concentration which varies to selectively render the material superconductive to record said information.

6. The recording medium of claim 5 wherein said material is $YBa_2Cu_3O_{7-x}$.

7. A method for recording information on a recording medium having an information recording layer made of a superconductive material having a critical temperature equal to or higher than 80° K., which method comprises:

radiating an oxygen ion beam to the information recording layer, and selectively controlling the amount of oxygen contained in the high temperature superconductive material, to a predetermined amount thereby to record the information on said recording medium.

8. A method of reproducing information from a recording medium having an information recording layer made of a superconductive material having a critical temperature equal to or higher than 80° K., which method comprises:

positioning a pick-up coil close to the information recording layer; and detecting a different in amount of magnetic fluxes in the pick-up coil resultant from the presence or absence of a superconductive region in the information recording layer thereby to reproduce the information from the recording medium.

9. A information recording device comprising:

a base;

an information recording layer formed on said base and having first and second regions which are selectively arranged to collectively store digital information therein, said first and second regions being collectively formed of a material having a property selectively varied so that said material exhibits superconductive effects in said first region and normal electroconductive effects in said second region to thereby record said digital information therein.

10. The recording medium of claim 9 wherein said property being varied is the concentration of oxygen in said material.

11. The recording medium of claim 10 wherein said material is $YBa_2Cu_3O_{7-x}$.

12. The recording medium of claim 11 wherein x is less than or substantially equal to 0.7 in said material in said first regions to make the oxygen concentration thereof greater than or substantially equal to 6.3.

13. The recording medium of claim 12 wherein x greater than 0.7 in said material in said second regions.

14. The method of recording and reproducing information comprising:

providing a information storage device comprising a base, a magnetizable layer formed on the base and an information recording layer formed on the magnetizable layer and made of superconductive material;

recording information onto said information storage device by modifying a characteristic of said information recording layer to selectively render said information recording layer superconductive; and reading said information from said information storage device.

* * * * *